United States Patent [19]

Shanklin et al.

[11] Patent Number: 5,321,230

[45] Date of Patent: Jun. 14, 1994

[54] SEAL WIRE HEAT CONTROL SYSTEM

[75] Inventors: Frank G. Shanklin, Groton; Edward R. Lawson, Methuen, both of Mass.

[73] Assignee: Shanklin Corporation, Ayer, Mass.

[21] Appl. No.: 71,308

[22] Filed: Jun. 2, 1993

[51] Int. Cl.$^5$ .............................................. H05B 1/02
[52] U.S. Cl. ................................... 219/492; 219/508; 219/493; 219/505; 156/515; 156/583.9; 53/373.7
[58] Field of Search ............... 219/490, 492, 493, 497, 219/505, 508; 156/515, 251, 583.2, 583.9, 520; 53/373.7, 374.8, 512

[56] References Cited

U.S. PATENT DOCUMENTS

| Re. 30,010 | 5/1979 | Shanklin | 53/552 |
|---|---|---|---|
| 3,490,981 | 1/1970 | Shanklin | 156/583 |
| 3,679,518 | 7/1972 | Andler et al. | 156/351 |
| 4,219,988 | 9/1980 | Shanklin et al. | 53/550 |
| 4,377,738 | 3/1983 | Berg | 219/490 |
| 4,464,219 | 8/1984 | Colombo et al. | 156/251 |
| 4,506,146 | 3/1985 | Rice | 219/499 |
| 4,512,138 | 4/1985 | Greenawalt | 53/451 |

Primary Examiner—Mark H. Paschall
Attorney, Agent, or Firm—Barlow & Barlow, Ltd.

[57] ABSTRACT

A seal wire heat control system adapted to record in memory the immediate history of the operation of the seal wire and to adjust the time duration of the application of voltage to the seal wire in accordance with a predetermined program. The application of heat is controlled according to the running history of the machine. At start up, a relatively long pulse of power is sent through the wire to make a seal for a predetermined number of times. When the count is reached, an intermediate pulse is provided to the wire for a predetermined number of times. When this count is reached, a short pulse is provided to the wire. A reset timer monitors idle time. If no seal is executed after a predetermined time, the entire system, including counters, resets to prepare for delivery of a long pulse to the wire. A safety timer is also provided for limiting the duration of power to the wire within the wire's safety threshold value.

10 Claims, 4 Drawing Sheets

SEAL WIRE HEAT CONTROL SYSTEM

BACKGROUND OF THE INVENTION

This invention relates to seal wire heat control systems and, more particularly, to seal wire heat control systems for sealing plastic films used in plastic packaging.

For the past 40 or 50 years, hot wires have been used to make seals when sealing plastics, particularly plastic films such as those used in plastic packaging, especially shrink packaging. In some cases, the hot wires are used to merely make a seal in the edge of the film, but more frequently they are used to seal and sever the edge of a pouch or bag from the succeeding pouch and/or from a selvedge edge of the film. In a typical application two layers of film, one superimposed on the other, will be sealed together by means of a hot wire pressing against the film and trapping it between the wire and an elastomer bed. The hot wire will simultaneously seal the edges of the film together on both sides of the wire while severing, by melting and/or softening, the film trapped between the wire and the elastomeric bed.

For many years control of the temperature of the wire has been a major problem in the industry. If the wire runs too cool, it will not make a proper seal and cut in the thermoplastic film. If the wire runs too hot, it may destroy the seals adjacent to the wire by overheating them, and the excessive temperature will cause some films to stick to the wire and gum up. Some films, such as polyethylene, will smoke, and films such as PVC will give off fumes and form a black carbonaceous residue on the seal wire if the wire gets too hot. Thus, seal wire temperature control is extremely important.

Known sealing systems have suffered from the foregoing problems. For example, U.S. Pat. Nos. 3,490,981 and Re 30,010 to F. G. Shanklin show an L-Sealer machine using hot wire seals such that two seal wires are brought together at a corner to form an "L" U.S. Pat. No. 4,219,988 to Shanklin et al shows a Form-Fill-Seal machine in which a single seal wire makes the transverse seals. Both types of prior art machines encounter similar problems in controlling the seal wire temperature.

Temperature control of the wire, in prior art devices, was accomplished with several types of systems, each of which was prone to inaccuracies of control. The earliest form of such wire temperature control was an impulse hot wire seal in which voltage was imposed across a length of a resistance wire for a period of time that was predetermined by a timer. The wire would heat to a certain temperature and then shut off. As long as packaging speeds were slow (10-12 packages per minute), this system seemed to work quite well. As soon as speeds increased, the seal jaw would heat up and the wire would build up residual heat as the machine continued to run. The seal wire and jaw would gradually overheat with the resultant problems of poor seals and gummed up wires.

The next step in the process of improving wire temperature control was to add a wire temperature switch, sometimes called a compensator switch, to the seal wire system. The wire temperature switch consisted of a limit switch or set of electrical contacts mounted on an adjustable base, which was positioned so that the switch would be operated by a wire follower as the seal wire expanded. Customarily, seal wires have one fixed end and one movable end, and tension in the seal wire is maintained by a spring attached to a wire follower to which is attached the movable end of the seal wire. As the seal wire expands the follower will move, driven by the spring. At a predetermined temperature setting, the wire will have expanded a certain amount allowing the wire follower to move until it actuates the limit switch turning off the power to the wire. A low voltage current across the wire can be maintained at all times to prevent the wire from returning to room temperature. This shortens the time cycle required to make a first seal and results in a more uniform operation of the sealer.

With all the above mentioned systems, as the machine ran faster and more power was input to the seal wire, residual heat would build up in the seal wire and the mating beds, and, notwithstanding the wire temperature switch control, the machine would run hot. Such excessive heat would cause smoking, gumming, and deterioration of the seal.

An additional problem occurred with the above described system. Since a system with a wire temperature switch (or compensator switch) depends on measuring the length of the seal wire to determine the seal wire heat, the distance between the fixed end and movable end of the wire must remain constant. Any increase in the length of the arm upon which the switch was mounted due to thermal expansion would also add to the temperature of the seal wire. In fact, the seal wire would increase in temperature by an amount equal to the increase in temperature of the seal arm multiplied by the coefficient of expansion of the seal arm and divided by the coefficient of expansion of the seal wire. Thus, since the most common construction for seal arms is aluminum with a coefficient of expansion of $13 \times 10^{-6}$ and the seal wires are made of a nickel, chromium, iron alloy with a coefficient of expansion of approximately $8 \times 10^{-6}$, one degree rise in the temperature of the seal arm will result in 1.6 degrees temperature rise of the seal wire. It is not unreasonable to expect a temperature rise in the seal arm of at least 70° F. which will cause a 112° F. increase in temperature of the seal wire. This is in addition to the temperature increase from increased residual heat accumulating in the wire and beds. It can be seen from the foregoing that it is not possible to accurately control the seal wire temperature by measuring the length of the seal wire with a device that is mounted on a seal arm which gets hot from use.

Other prior art devices measured the temperature of the seal wire by measuring the resistance of the wire between impulses of heat. Thus, a device can be built that will impose a brief pulse of power to a seal wire, disconnect the power, and measure the resistance of the wire, then resume applying power to the wire, then again measure the resistance, etc. until the resistance measured corresponds to the desired seal wire temperature. Although these systems have been built, they suffer from un-reliability One reason for this is that the resistance of the seal wire is already very low, on the order of 2 ohms for a 60" length of a typical seal wire, and the rate at which the resistance of the seal wire changes in relation to the temperature of the wire is very small. Thus, any resistance that is entered into the system, such as by a poor wire connection, moisture, corrosion, etc., will have considerable effect on the control of the seal wire resulting in erratic temperatures. A further disadvantage to this prior art system is that it has been very expensive.

In summary, three systems have been used in the prior art for determining and controlling a seal wire's temperature. The first system imposed a voltage across the seal wire for a period of time that was predetermined by a timer. This system neglects the effect jaw parts due to residual heat from previous seals. The second system measures the length of the seal wire as it expands with increased temperature. This system is faced with the inaccuracies that occur from elongation of the seal arm caused by thermal expansion of the seal arm as it heats up due to previous seals. The third system measures the resistance of the seal wire and, by using resistance wire with a proper resistance to temperature gradient, translates the resistance into seal wire temperature and then controls the power to the wire. This system runs into errors occurring from trying to accurately measure extremely small resistance changes in a very low resistance wire and from other resistances that can occur anywhere in the seal wire circuit.

SUMMARY OF THE INVENTION

The system of the present invention operates by recording in memory the immediate history of the operation of the seal wire and adjusting the time duration of the application of voltage to the seal wire in accordance with a predetermined program. Thus, the present invention is an adaptive seal wire heat system which adapts the application of heat to the wire in accordance with the prior running history of the machine. The present invention is particularly well suited for controlling the temperature of a seal wire for use in plastic packaging apparatuses.

The operation of the present invention is as follows. When the machine with the seal wire starts up with the seal jaw cold and the mating elastomer bed cold, a relatively long impulse of power is needed across the seal wire to bring it up to temperature and make a seal. Therefore, the control system supplies a long impulse of voltage to the seal wire. If the machine continues to run at a rate of sealing which exceeds a certain predetermined rate, after a few heat cycles, the seal wire and elastomer bed achieve a temperature sufficient to make a proper seal in the film with a somewhat shorter impulse of voltage across the seal wire. Therefore, the voltage is impulsed for an intermediate period of time. If the machine were to be run continuously for a prolonged period of time at a rate of sealing which exceeded a predetermined rate, the entire seal arm, bed, and wire system would heat up to the point that it would tend to overheat if the same amount of power were to be fed to the wire. Therefore, the system will cut back to a short duration impulse of voltage across the wire. During continued operation, this short impulse of voltage is sufficient to keep the wire at the proper temperature to produce good seals. If the machine is shut down for a certain predetermined period of time, the seal wire control resets to its previous long heat impulse condition and the adaptive cycle starts all over again.

In the preferred embodiment of the present invention, there is a constant low voltage applied across the seal wire when it is not receiving an impulse to keep the wire warm and to stabilize the operation of the machine.

BRIEF DESCRIPTION OF THE DRAWINGS

FIG. 1A is a side view of the mechanism of FIG. 1 without product supports and film clamps;

DESCRIPTION OF THE PREFERRED EMBODIMENT

Figure 1:
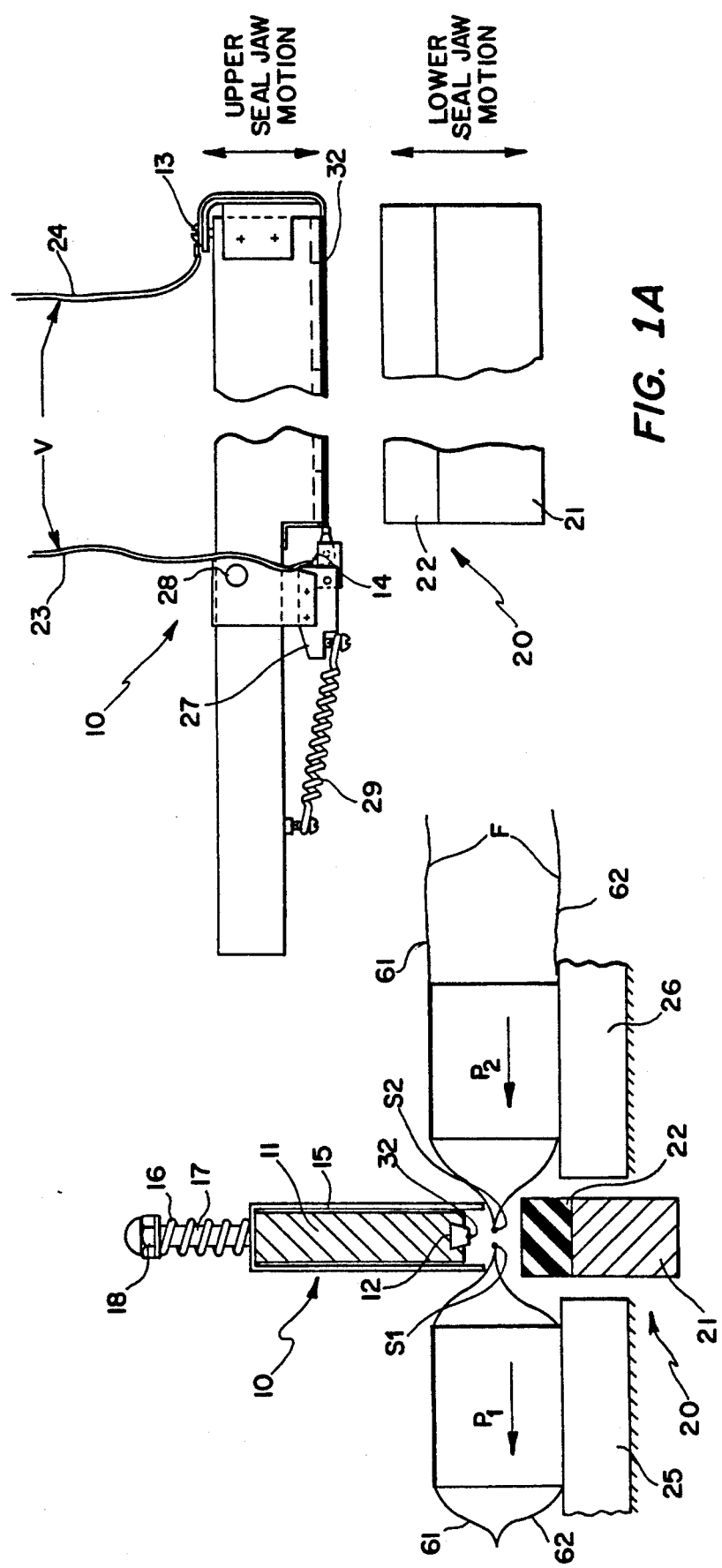
FIG. 1 is a cross-sectional view of the seal jaw portion of a typical impulse hot wire sealing mechanism with product supports shown.

Referring to the drawings there is shown in FIG. 1, a cross-sectional view of the seal jaw portion of a typical impulse hot wire sealing mechanism and in Fig. IA a side view of the same mechanism in which environment the present invention may be employed. The mechanism includes a seal jaw assembly 10 and a mating jaw assembly 20. The seal jaw assembly is composed of a seal bar 11 in which is set insulator 12 carrying a seal wire 32 which is the heating element that forms the seal in the plastic packaging film F. A film clamp 15 which is retained in the extended position by spring 16 retained on stud 17 by nut 18, prevents the hot seal wire 32 from coming into contact with packaging film F until the seal jaw is fully closed. When the seal jaw 10 closes with mating jaw 20, film clamp 15 is forced upward compressing spring 16 to permit the seal wire 32 to come into contact with film F. The mating jaw 20 is composed of a support bar 21 and an elastomeric pad 22. In some instances, elastomeric pad 21 is covered with a release covering, typically glass cloth impregnated with tetrafluoroethylene (not shown).

Packages P1 and P2 are customarily wrapped in a continuous web of wrapping film having an upper layer 61 and a lower layer 62, Alternately, the film may be in the shape of a tube. The purpose of the sealing mechanism is to seal upper film layer 61 to lower film layer 62 while simultaneously severing package P1 from P2. In forming a seal in film F between packages P1 and P2, the seal jaw mechanism 10 is urged against mating jaw 20 by conventional means well known in the art such that seal wire 32 traps and compresses layers 61 and 62 of film F together between the seal wire 32 and the elastomeric pad 22. The wire is heated with an electrical voltage impulse and as the wire heats up the two layers of film 61 and 62 are sealed together and the hot wire pressing against the pad 22 forces its way through the film severing apart the film at the wire. Thus a seal S1 is formed in the film around package P1 and also a seal S2 is formed in the film around package P2 and a cut is made severing the film of package P1 from the film of package P2. Supports 25, 26 hold packages P1, P2 at the proper elevation for sealing.

It should be noted in some machines, upper sealing jaw mechanism 10 moves while lower sealing jaw is stationary, whereas in other machines both jaws 10 and 20 are moveable. It should also be noted that product supports 25, 26 may be conveyors, or one a support and the other a conveyor. The sealing jaw mechanism of the invention operates equally well with all mechanical jaw mounting and product handling configurations.

The term seal wire includes many cross sections of resistance material in addition to round, for example, flat, tapered, reflex double seam and beaded bands together with T, triangle, half round, oval profiles and even twisted for a perforation seal. Referring now to FIG. 1A there is shown how a seal wire can be mounted in sealing jaw 10. The fixed end of seal wire 32 is attached by fixed screw 13 and the moveable end is attached at terminal 14. Terminal 14 is fastened to a moveable carrier mechanism 27 which is free to pivot about pivot pin 28 in response to a constant tension supplied by extension spring 29. When an electrical voltage V is imposed across the supply wires 23, 24, the seal wire heats up and consequently expands in length. The tension supplied by spring 29 together with movement permitted by moveable carrier mechanism 27, allows the moveable end of the seal wire 32 to move as the seal wire expands, thereby keeping seal wire 32 straight while the seal is being made.

In order to obtains good, strong seals, accurate control of the seal wire temperature is essential during all operating conditions, and the means for maintaining this control during start and stop operation of the wrapping machine is the objective of this invention.

Figure 2:
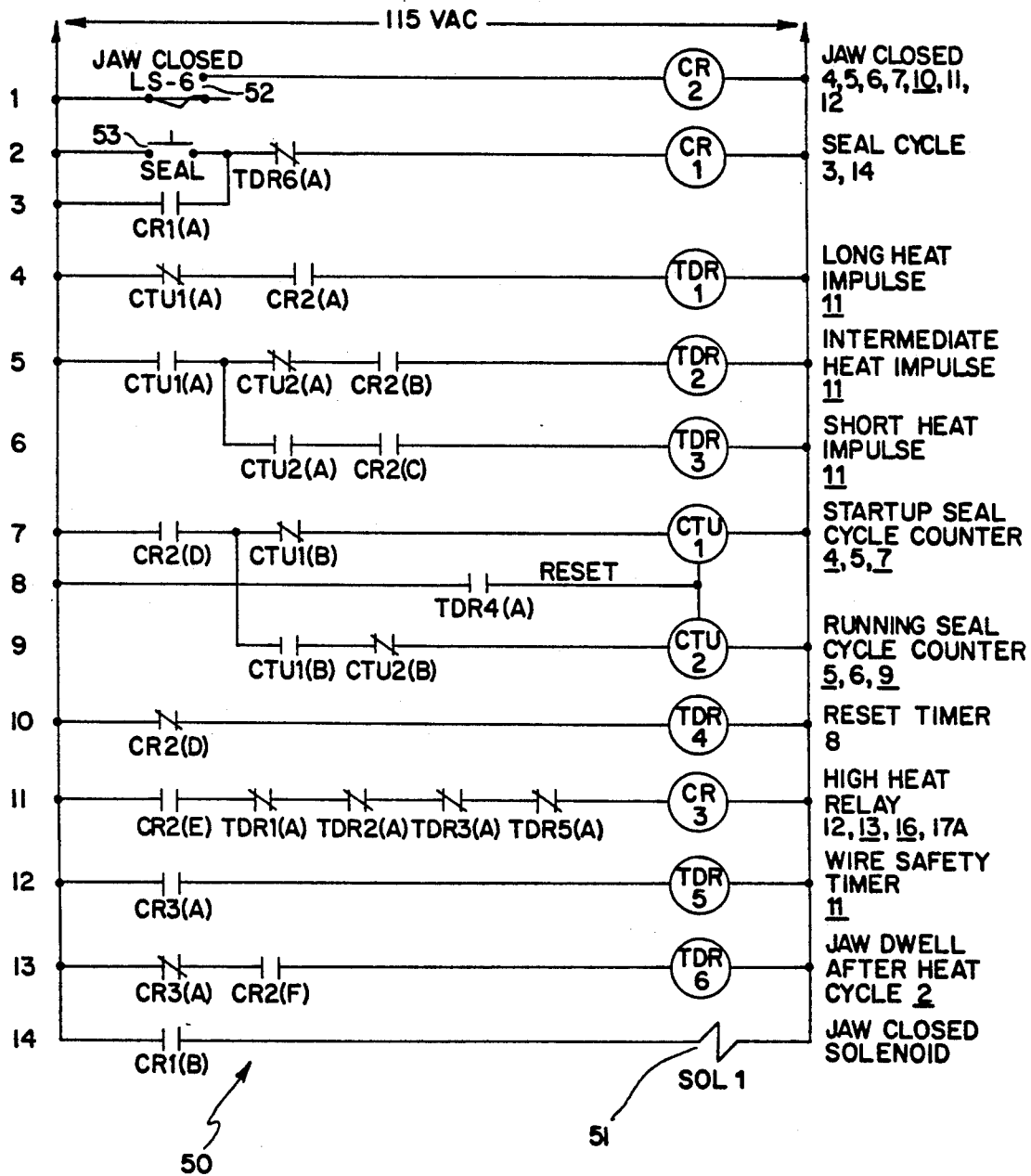
FIG. 2 is a schematic wiring diagram of the relay and timer control circuit of the present invention.

Turning to FIG. 2, the circuit 50 that controls the seal wire heat consists of five timers and two counters. Timer TDR1 is the long duration timer which sets the duration of the voltage impulse across the seal wire 32 in FIG. 3 for start up seals and for sealing after the machine has been idle. Timer TDR2 is the intermediate duration timer which sets the duration of voltage impulse across the seal wire 32 after the initial number of start up seals counted by counter CTU1 have been made. Timer TDR3 is the short duration timer which determines the duration of time the voltage is applied to the seal wire 32 after a predetermined number of seals as counted by counter CTU2 have been made during continuous operation of the machine. Timer TDR4 is a timer that resets the impulse timing sequence. If no seals have been made during the time set on timer TDR4, the circuit will determine that the machine has been idle and will reset counters CTU1 and CTU2 thereby returning the wire heat duration to the TDR1 setting. Timer TDR5 is a safety timer that insures that the duration of voltage impulse to the wire 32 will not exceed that which the wire 32 can withstand without damage to the wire 32 or to other components of the machine.

When the wrapping machine containing the hot wire sealing system is first started up, the seal wire 32 operates for a predetermined number of pulses at the long duration determined by timer TDR1. After a predetermined number of sealing cycles of long duration as determined by counter CTU1 have been performed, and providing that reset timer TDR4 does not time out, CTU1 disconnects, and timer TDR1 no longer controls the duration of voltage across the wire. Now timer TDR2, the medium duration timer, determines the duration of the voltage impulse. After another predetermined number of sealing cycles as determined by counter CTU2 have been completed, and providing timer TDR4 does not time out, the voltage impulse to the wire 32 is controlled by short duration timer TDR3 rather than timer TDR2. If the sealing impulses on the wire are delayed or interrupted such that the reset timer TDR4 times out, then the impulse timing sequence starts over again with time TDR1.

Thus, it will be seen that if the sealing system of the wrapping machine, such as shown in FIG. 1, is operated slowly, such that reset timer TDR4 times out after each seal, long duration impulse timer TDR1 will control the sealing wire at all times. This is as it should be because the sealing wire will never have the opportunity to heat the sealing jaws and beds, and greater wire heat is required to make a seal. It will also be seen that if the sealing cycle proceeds normally the control will progress to timer TDR2 and then to timer TDR3. If the operation of the machine is interrupted at any time such that timer TDR4 times out before he next seal is initiated, timer TDR4 will reset counters CTU1 and CTU2, and the sealing cycle will again return to TDR1 as if the machine had been sitting idle. This, again, is proper operation since it will take a predetermined number of cycles to again warm the machine up. The time intervals on all of the timers are adjustable, permitting the machine to be programmed, if necessary, for various speeds of operation. In practice, however, it has been found that one setting for each of the timers and counters works well for many types of operation.

Timer TDR5 is a safety timer to control the maximum duration that the sealing voltage can be imposed upon the wire 32. If any of the other timers should fail or be set incorrectly, timer TDR5 will ensure that the wire does not overheat and break.

When operating a wrapping machine with this adaptive wire heat control circuit, all that is required to adjust the amount of heat applied to the seal wire 32 is to adjust the voltage applied across the wire. This adjustment is made by adjusting the heat potentiometers 38, 40 and 42 illustrated in FIG. 3. A higher voltage setting will cause the wire 32 to heat up more and a lower voltage setting to heat up less under all timing sequences described above. Thus, the operator can easily set the seal wire temperature while a seal is being made by adjusting the sealing heat control, potentiometer 38. In many types of wrapping machines, a constant heat is imposed across the wire via constant heat control, potentiometer 40, to prevent the wire from returning to room temperature during idle periods. This constant heat is particularly helpful in obtaining a faster first seal when starting up after an idle period.

Referring to FIG. 2, a relay and timer control 50 for making the adaptive seal wire circuit operation is shown. The circuit operates using relay and timer logic but it will be understood by those skilled in the art, that this may also be accomplished using a programmable logic controller or other computer logic systems.

Figure 3:
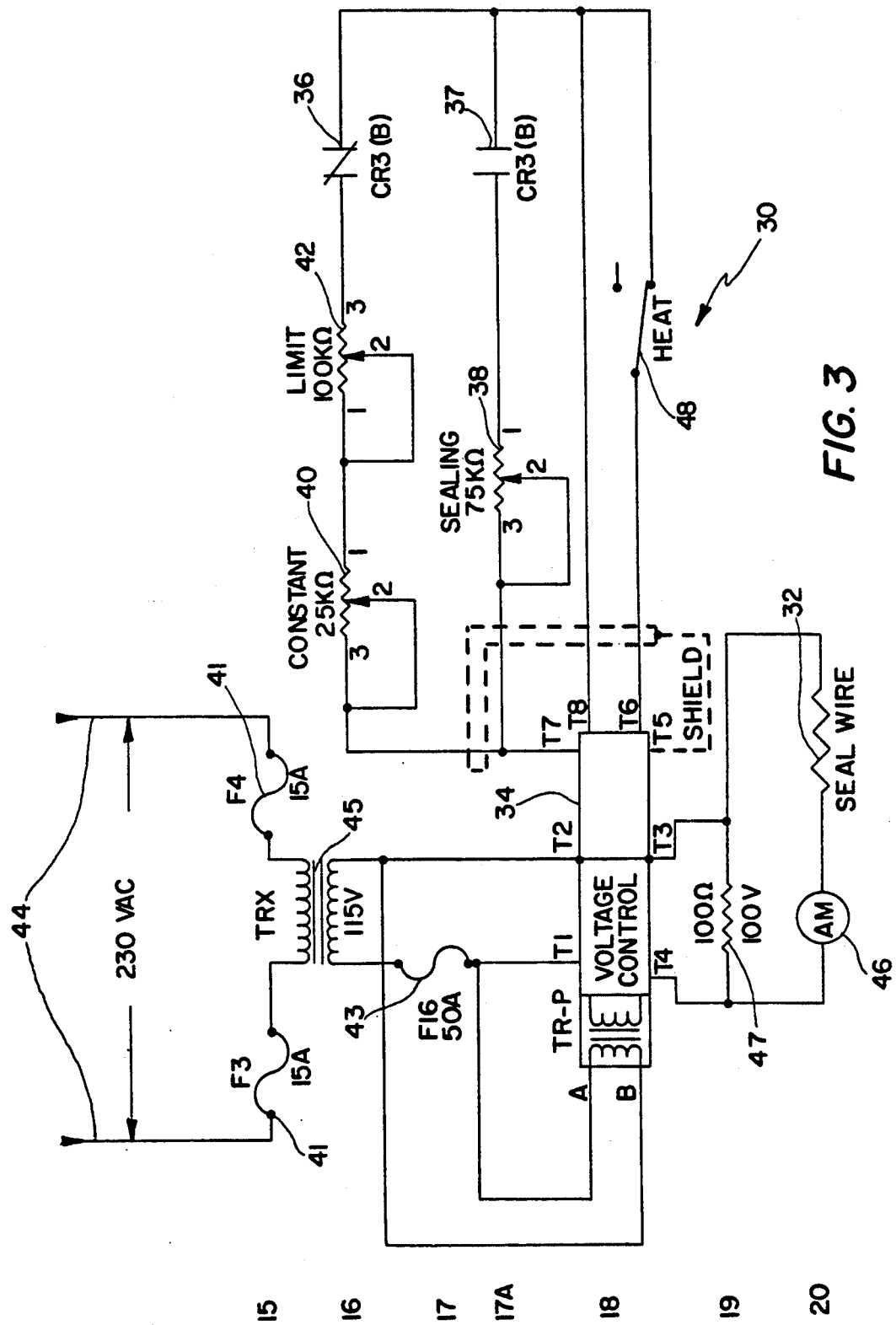
FIG. 3 is a schematic wiring diagram of the seal wire heat control circuit of the present invention.

In FIG. 3, a seal wire heat control circuit 30, which imposes two voltages on a seal wire 32, is shown. There is a constant voltage for when the machine is idling and a sealing voltage for when the machine is running and making seals. A voltage 44 (230 volts) is applied to the input to the transformer TRX 45 and is protected by fuses 41 on line 15. The transformer TRX is shown between lines 15 and 16 and output fuse 43 shown on line 17 protects the SCR Voltage Control 34 which is shown on line 18. The seal wire 32 is shown on line 20 in series with an ammeter 46, and the power input to the seal wire 32 is controlled by the SCR Voltage Control 34. Line 19 shows a resistor 47 to bleed power and protect the SCR Voltage Control 34 should a seal wire 32 break. Line 16 shows a potentiometer 40 to control the Constant Heat with a limit potentiometer 42 which limits the maximum constant output of the SCR Voltage Control 34. On line 17A is a potentiometer 38 to control the sealing heat. A heat switch 48 on line 18 allows the power to the seal wire 32 to be turned off for setting up the machine.

The output of power to the seal wire 32 is controlled by the resistance across terminals T6 and T7 of the SCR Voltage Control 34, which is determined by the constant, limit, and sealing potentiometers (40, 42 and 38, respectively). The lower the resistance, the higher the power output of the SCR Control. The constant and limit potentiometers in this circuit are connected in series and their resistance is additive. Thus, the limit potentiometer 42 is set for the maximum safe operation of the seal wire 32 with the constant potentiometer set for maximum heat (zero resistance.

Figure 4:
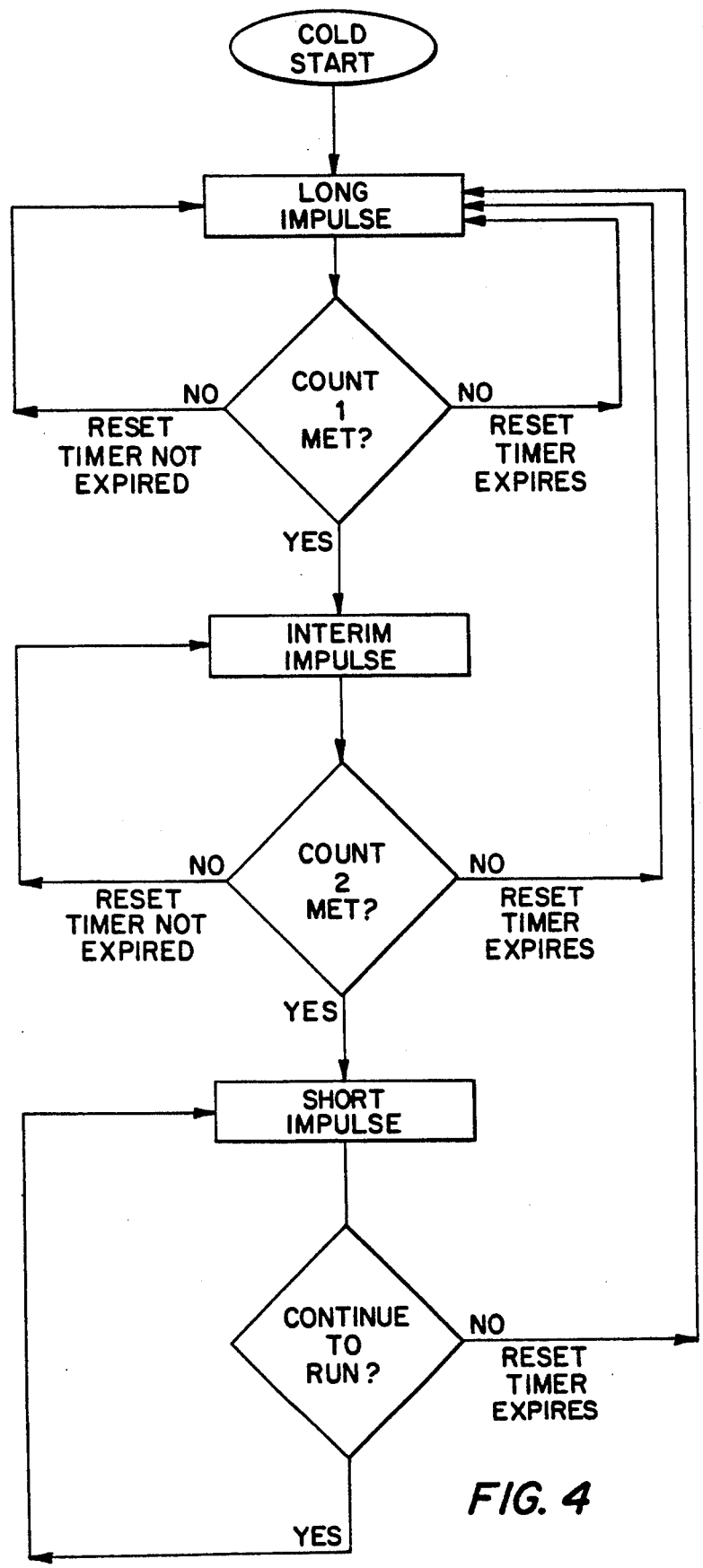
FIG. 4 is a flow chart illustrating operation of the circuit of the present invention.

Normally under machine idling conditions, the constant potentiometer 40 and limit potentiometer 42 in series across the SCR Heat Control 34 provide a low heat input to the wire 32 to prevent it from returning to room temperature. When seal heat is called for, the normally closed contacts 36 of CR3(B) located on line 16, open and the normally open contacts 37 of CR3(B) located on line 17 close transferring control of the seal wire voltage from potentiometers 40 and 42 to sealing potentiometer 38. Normally the resistance setting on sealing potentiometer 38 will be less than that of series connected potentiometers 40 and 42, and since there will be less resistance between terminals T6 and T7 on the SCR Control 34, the voltage input to the seal wire 32 will increase. It will be seen from the above that once the constant and sealing voltages are set, controlling the duration of the closure of CR3(B) controls the application of sealing power to the seal wire 32. The purpose of the circuit diagram 50 as shown in FIG. 2 from lines 1 through 13, is to control this duration while adapting the duration to adjust for the recent operating history of the machine. Referring to the flow chart in FIG. 4, will easily explain the logic of the control of impulses to the seal wire.

The seal cycle can be initiated manually as shown by the seal button 53 on line 2 in FIG. 2, which operates through normally closed contacts TDR6(A) to operate relay CR1. Relay CR1 latches itself in through contacts CR1(A) on line 3. Contacts CR1(B) simultaneously send power to the solenoid valve 51, SOL1, which sends air to a pneumatic cylinder (not shown) causing the seal arm to close. Of course, in an automatic machine the manual seal button can be replaced by an electric eye, a set of relay points, or some other means of automatically initiating the seal cycle. As the seal jaw of the machine closes, it activates a limit switch 52, LS6, energizing the coil of relay CR2 shown on line 1. When CR2 operates, all normally open CR2 contacts (A,B,C,D,E and F) close simultaneously and normally closed contacts CR2(D) on line 10 open resetting the heat idle timer TDR4. The operation of TDR4 is discussed in greater detail below.

During the first seal cycle of the seal arm, power is applied to the Long Impulse timer TDR1 on line 4 through the normally closed contacts CTU1(A) and the now closed contacts CR2(A). Simultaneously, power flows through the now closed contacts CR2(D) and normally closed contacts CTU1(B) initiating one count of counter CTU1 shown on line 7. Simultaneously, power flows through now closed contacts CR2E and normally closed contacts TDR1(A), TDR2(A), TDR3(A) and TDR5(A) to energize heat relay CR3. Normally open contacts CR3(A) shown on line 12 close starting wire safety timer TDR5. In the event of a circuit failure, timer TDR5 will time out opening normally closed contacts TDR5(A) on line 11, thereby disconnecting CR3 and thus the sealing heat from the seal wire thereby preventing the wire from over heating.

Initiation of the seal cycle has caused CR2 and, consequently, CR3 to energize as stated above. When CR3 energizes, normally closed contacts CR3(A) on line 13 open preventing the activation of TDR6 by the closure of CR2(F). Upon completion of the sealing cycle, when relay CR3 on line 11 de-energizes, normally closed contacts CR3(A) on line 13 close energizing Jaw Dwell timer TDR6 through now closed contacts CR2(F). TDR6 determines how long the seal jaw stays closed after the sealing heat cycle. Upon its timing out, contacts TDR6(A) on line 2 open de-energizing relay CR1 which opens contacts CR1(B) on line 14 releasing solenoid 51 causing the seal arm to open. When the seal arm opens, limit switch 52, (LS6) on line 1 opens, thereby de-energizing CR2 and opening normally open contacts CR2 (A,B,C,D,E and F) and closing normally closed contacts CR2(D). This de-energizes timers TDR1, 2, 3 and 5 and sets up the appropriate counter (CTU1 or CTU2) for another count. Simultaneously, normally closed contacts CR2(D) close, initiating the timing of the reset timer TDR4.

The following description assumes that the reset timer TDR4 does not time out and that counters CTU1 and CTU2 do not reset. The heat cycle starts in Long Impulse mode and will continue to operate on Long Impulse as determined by TDR1 until sufficient counts, produced by the closure of normally open contacts CR2(D) on line 7, have occurred for counter CTU1 to count out. At this point, normally closed contacts CTU1(A) open deactivating the Long Impulse timer, and normally open contacts CTU1(A) close activating the Intermediate Impulse timer TDR2 through normally closed contacts CTU2(A) and now closed contacts CR2(B) on line 5. From this point on, TDR2 will control the Impulse cycle. Simultaneously, normally closed contacts CTU1(B) open deactivating counter CTU1. Now as the machine runs and a seal is made, power will flow through now closed contacts CTU1(B) and normally closed contacts CTU2(B) on line 9 to energize counter CTU2. The machine will continue to operate in this manner until counter CTU2 counts out, at which time normally closed contacts CTU2(A) on line 5 open deactivating Intermediate Impulse timer TDR2 and normally open contacts CTU2(A) on line 6 will close activating Short Impulse timer TDR3. Now as the seal cycles continue, the closure of CR2(C) will result in a Short Impulse cycle for the seal wire since Short Impulse contacts TDR3(A) on line will now be controlling the impulse of power applied to CR3, the high heat relay. It should be noted that when CTU2 counts out, it also opens normally closed contacts CTU2(B) so that no further counting is made on the counter. This is done so that a counter of limited capacity can be used. The machine will continue to run with the Short Impulse timer TDR3 controlling the length of voltage impulse to seal wire 32 unless a seal cycle is delayed sufficiently so that TDR4 on line 10 times out. If TDR4 times out, it resets counters CTU1 and CTU2, and the heat cycle returns to the Long Impulse cycle.

TDR4 is the timer that determines whether a seal is made frequently enough to keep the sealing system warm enough for normal operation. At the completion of the seal, TDR4 is initiated by normally closed contacts CR2(D) on line 10. If TDR4 completes its timing, contacts TDR4(A) will close energizing the reset of both timers CTU1 and CTU2 to zero, and the machine will return to its Long impulse cycle and will commence to operate as if the machine were just being started for the first time. If, however, a seal cycle is made prior to the time out of TDR4, contacts CR2(D) will open as soon as contacts 52 of LS6 energizes relay CR2, and timer TDR4 will not have a chance to time out. Therefore, contacts TDR4(A) will remain open and counters CTU1 and/or CTU2 will not reset.

There has been no attempt made to compensate for the difference in seal wire heat required for a machine that has warmed up and then shut down momentarily and/or a machine starting up cold. This could easily be done in accordance with the present invention. However, it has been found that the circuit shown in FIGS. 2 and 3 seems to work well for both conditions in all applications so far encountered. While it has been found that a tri-stage timing and control, as discussed above, works well in presently known applications, a system with only two stages or greater than three stages of timing control are also contemplated by the present invention.

It will be appreciated by those skilled in the art that various changes and modifications can be made to the illustrated embodiments without departing from the spirit of the present invention. All such modifications and changes are intended to be covered by the appended claims.

We claim:

1. In an apparatus for sealing thermoplastic film, said apparatus having at least one sealing jaw including an electrically heated seal wire for sealing together two layers of film along the length of said wire, the temperature of said wire being controlled by the voltage and duration of an electrical impulse across said wire during the process of sealing said film, a seal wire temperature control system, comprising:
   a power supply means for supplying said voltage for said seal wire;
   a switching means for applying said voltage to said wire during a sealing cycle;
   a first timer means for controlling the duration of said electrical impulse applied to said wire by said switching means during said sealing cycle;
   a first counter means for counting the number of sealing cycles produced by said apparatus while operating under the control of said first timer means;
   a second timer means for controlling the duration of said electrical impulse to said wire;
   means for transferring the control of the duration of said electrical impulse from said first timer to said second timer upon completion of a predetermined count by said first counter means;
   means producing a reset signal to said first counter after a preset period means to reset said counter thereby returning the control of said duration of said electrical impulse to said first timer means in the event that the operation of said apparatus should be interrupted for a period greater than the preset period preset.

2. In an apparatus as in claim 1 including a third timer means for controlling the duration of said electrical impulse to said wire; a second counter means for counting the number of said sealing cycles produced by said apparatus operating under control of said second timer means; means for transferring the control of the duration of said electrical impulse from said second timer means to said third timer means upon completion of a predetermined count by said second counter means; means whereby said means producing reset timer means sends a reset signal to both first and second counter means to reset both said first and said second counter means.

3. In an apparatus as in claims 1 or 2 in which the duration of the second timer means is shorter than the duration of the first timer means and the duration of the third timer means is shorter than the duration of the second timer means, and means are provided to adjust the duration of said short, medium and long duration timers, and to adjust the count of said first and second counter means.

4. In an apparatus as in claims 1 or 2 wherein means are provided to adjust the voltage of said electrical impulses applied across said seal wire by said switching means to regulate the temperature of said seal wire.

5. In an apparatus as in claims 1 or 2 wherein a low voltage is applied across said seal wire during the periods of time when said electrical impulses are not applied across said wire.

6. In an apparatus as in claims 1 or 2 wherein a safety timer limits the duration of the voltage applied to said seal wire to avoid overheating.

7. In an apparatus for sealing thermoplastic film, having a random rate of operation, said apparatus having at least one sealing jaw including an electrically heated seal wire for sealing together two layers of film along the length of said wire, the temperature of said wire being controlled by the voltage and duration of an electrical impulse across said wire during the process of sealing said film, a seal wire temperature control system responsive to said rate of operation;
   a power supply means for supplying said voltage for said seal wire;
   switching means for applying said voltage to said wire during a sealing cycle;
   a long duration timer for controlling the duration of said electrical impulse applied to said wire by said switching means during said sealing cycle;
   a first counter means for counting the number of sealing cycles produced by said apparatus while operating under the control of said long duration timer;
   a medium duration timer means for controlling the duration of said electrical impulse to said wire;
   means for transferring the control of the duration of said electrical impulse from said long duration timer means to said medium duration timer means upon completion of a predetermined count by said first counter means;
   a second counter means for counting the number of said sealing cycles produced by said apparatus operating under control of said medium duration timer;
   a short duration timer means for controlling the duration of said electrical impulse to said wire;
   means for transferring the control of the duration of said electrical impulse from said medium duration timer means to said short duration timer means upon completion of a predetermined count by said second counter means;
   means provided to adjust the duration of said short, medium and long duration timer means, and to adjust the count of said first and second counter means;
   a reset timer means producing a reset signal to said first counter means and to said second counter means to reset said counter means after a preset period thereby returning the control of said duration of said electrical impulse to said long duration timer in the event that the operation of said apparatus should be interrupted for a period greater than the period preset into said reset timer means.

8. In an apparatus as in claim 7 wherein means are provided to adjust the voltage of said electrical impulses applied across said seal wire by said switching means to regulate the temperature of said seal wire.

9. In an apparatus as in claims 7 or 8 wherein a lower voltage is always applied across said seal wire during those periods of time when said electrical impulses are not applied across said wire.

10. In an apparatus as in claims 7, 8 or 9 wherein a safety timer limits the duration of the voltage applied across said seal wire to avoid overheating.

* * * * *